United States Patent
Gross et al.

(10) Patent No.: US 7,751,910 B2
(45) Date of Patent: Jul. 6, 2010

(54) HIGH-ACCURACY VIRTUAL SENSORS FOR COMPUTER SYSTEMS

(75) Inventors: Kenny C. Gross, San Diego, CA (US); John J. Cooley, Escondido, CA (US); Aleksey M. Urmanov, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 328 days.

(21) Appl. No.: 11/787,604

(22) Filed: Apr. 16, 2007

(65) Prior Publication Data

US 2008/0255819 A1 Oct. 16, 2008

(51) Int. Cl.
*G05B 13/02* (2006.01)
*G01D 18/00* (2006.01)
*G01C 25/00* (2006.01)
*G06F 17/00* (2006.01)
*G01F 15/00* (2006.01)

(52) U.S. Cl. ............... 700/52; 702/90; 702/91; 702/104; 702/116; 702/127; 702/182

(58) Field of Classification Search .................. 700/52; 702/104, 127, 90, 91, 116, 182
See application file for complete search history.

(56) References Cited

U.S. PATENT DOCUMENTS

| 4,908,775 | A  | * | 3/1990  | Palusamy et al. | ............. 702/34  |
| 6,556,939 | B1 | * | 4/2003  | Wegerich        | ............ 702/127 |
| 6,876,943 | B2 | * | 4/2005  | Wegerich        | ............ 702/127 |
| 7,194,392 | B2 | * | 3/2007  | Tuken et al.    | .............. 703/2 |
| 7,292,952 | B1 | * | 11/2007 | Gross et al.    | ............ 702/104 |

OTHER PUBLICATIONS

Gross et al., "Towards Dependability in Everyday Software Using Software Telemetry" IEEE Mar. 2007. p. 9-18.*

* cited by examiner

*Primary Examiner*—Ramesh B Patel
*Assistant Examiner*—Thomas H Stevens
(74) *Attorney, Agent, or Firm*—Park, Vaughan & Fleming LLP; Anthony P. Jones

(57) ABSTRACT

Embodiments of the present invention provide a system that estimates the value of a virtual sensor. The system first samples values for performance metrics using external sensors that are coupled to a system and internal sensors that are built into the system. Next, the system generates an inferential sensing model for the system from the sampled values. Then, during operation, the system samples values of performance metrics using the internal sensors and uses the inferential sensing model and the sampled values from the internal sensors to estimate the values of performance metrics for removed external sensors (i.e., virtual sensors).

21 Claims, 3 Drawing Sheets

HIGH-ACCURACY VIRTUAL SENSORS FOR COMPUTER SYSTEMS

BACKGROUND

1. Field of the Invention

Embodiments of the present invention relate to techniques for enhancing the availability and reliability of computer systems. More specifically, embodiments of the present invention relate to a method and an apparatus for estimating the value of a sample from a virtual sensor.

2. Related Art

As electronic commerce grows more prevalent, businesses increasingly rely on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is critically important to ensure high availability in such enterprise computing systems.

To achieve high availability in enterprise computing systems it is necessary to be able to capture unambiguous diagnostic information that can quickly pinpoint the source of defects in hardware or software. Hence, some high-end servers contain hundreds of physical sensors that measure temperatures, voltages, and currents throughout the system. These high-end servers can also include software sensors that monitor system performance information such as loads, throughputs, and transaction latencies.

These sensors help to protect the system by making it possible for the system to detect when one or more parameters are out of bounds. If the system detects that one or more parameters are out of bounds, the system can generate an alarm and, if necessary, can shut down a component, a system board, a domain, or the entire system. This is typically accomplished by applying threshold limits to signals received from the physical sensors and/or the software sensors. In this way, if a system parameter strays outside of an allowable range, an alarm can be activated and protective measures can be taken.

As computer systems become more complex, it is desirable to provide more monitoring sensors. Unfortunately, additional physical sensors are costly. They also require support hardware (such as analog-to-digital (A/D) conversion chips) and consume precious real estate within the computer system. On the other hand, providing additional software sensors involves additional computational overhead. Because of these costs, system designers can face difficult choices about which system parameters should be monitored and which should be left unmonitored.

Hence, what is needed is a technique for monitoring system parameters without the above-described problems.

SUMMARY

Embodiments of the present invention provide a system that estimates the value of a virtual sensor. The system first samples values for performance metrics using external sensors that are coupled to the system and internal sensors that are built into the system. Next, the system generates an inferential sensing model for the system from the sampled values. Then, during operation, the system samples values of performance metrics through the internal sensors, and uses the inferential sensing model and the sampled values from the internal sensors to estimate the values of performance metrics for removed external sensors.

In some embodiments, during operation, the system uses the inferential sensing model and sampled values of performance metrics from the other internal sensors to estimate the value of a performance metric for at least one removed internal sensor.

In some embodiments, during operation the system uses the inferential sensing model to estimate the value of a performance metric for at least one internal sensor from sampled values of performance metrics collected from the other internal sensors.

In some embodiments, the system determines if the sampled values or the estimated values for the performance metrics have exceeded a threshold. If so, the system generates an alarm.

In some embodiments, when sampling the performance metrics, the system executes one or more test loads on the system and samples the performance metrics while executing the test loads.

In some embodiments, when generating an inferential sensing model, the system uses a Logical Combination of Regression Primitives (LCORP) technique, a Non-Linear Non-Parametric (NLNP) regression technique, or another statistical or regression technique to generate a mathematical model that correlates sampled values of performance metrics.

In some embodiments, the system is: a chip; a component; a field-replaceable unit (FRU); or a computer system.

In some embodiments, the performance metrics are physical system properties which can include: temperatures; relative humidities; cumulative or differential vibrations; fan speeds; acoustic signals; currents; voltages; time-domain reflectometry (TDR) readings; or other physical properties that indicate the performance of the system.

In some embodiments, the performance metrics are software metrics which can include: system throughput; transaction latencies; queue lengths; load on the central processing unit; load on the memory; load on the cache; I/O traffic; bus saturation metrics; First-In, First-Out (FIFO) overflow statistics; or other software metrics that indicate the performance of the system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), solid-state memory such as flash memory, or other media capable of storing computer readable media now known or later developed.

Server

Figure 1A:
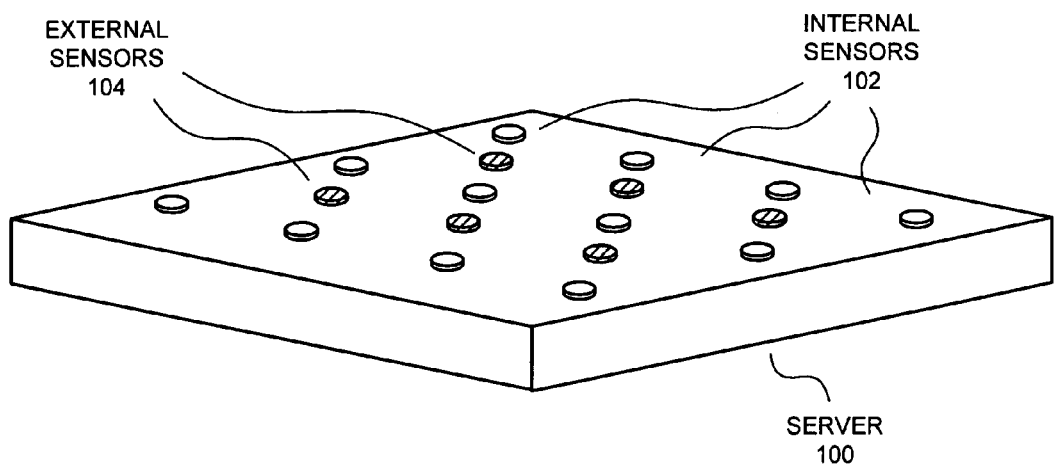
FIG. 1A illustrates a server that includes a number of internal sensors and a number of external sensors configured to generate an inferential sensing model in accordance with embodiments of the present invention.
Figure 1B:
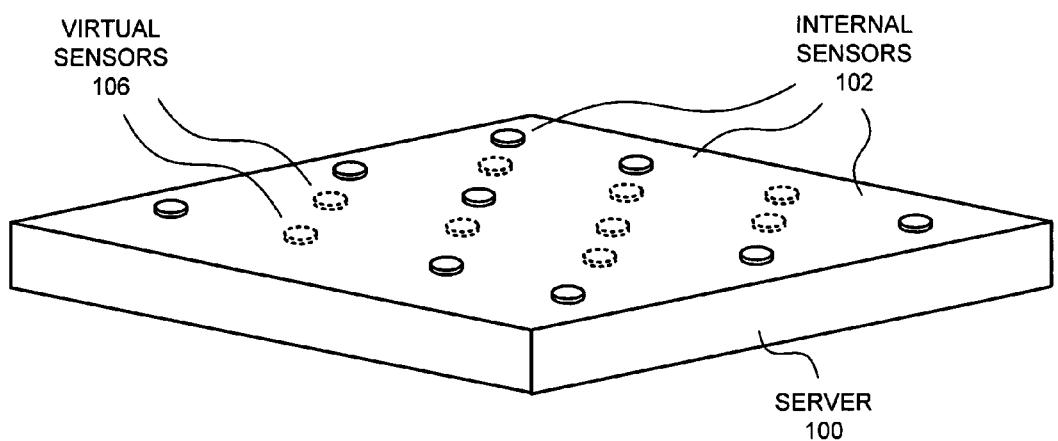
FIG. 1B illustrates a server that includes a number of internal sensors configured to use the inferential sensing model to estimate the value of virtual sensors in accordance with embodiments of the present invention.

FIG. 1A illustrates a server 100 that includes a number of internal sensors 102 and a number of external sensors 104 configured to generate an inferential sensing model in accordance with embodiments of the present invention. FIG. 1B illustrates a server 100 that includes a number of internal sensors 102 configured to use the inferential sensing model to estimate the values of virtual sensors 106 in accordance with embodiments of the present invention. In FIG. 1B, all of the external sensors 104 and some of the internal sensors 102 used for the generation of the inferential sensing model in FIG. 1A have been removed and the values sampled from the remaining internal sensors 102 are used to estimate the values of the removed sensors ("virtual sensors").

Although server 100 is used for the purposes of illustration, embodiments of the present invention can be applied to other computer systems, such as desktop computers, workstations, embedded computer systems, laptop computer systems, handheld computing devices, automated manufacturing systems, and other computer systems. Furthermore, embodiments of the present invention can be applied to individual chips, components comprised of multiple chips, field-replaceable units (FRUs), or entire systems.

Internal sensors 102 and/or external sensors 104 can include physical sensors which can be coupled to server 100 to collect samples of system performance metrics such as temperatures, relative humidity, cumulative or differential vibrations, fan speed, acoustic signals, currents, voltages, time-domain reflectometry (TDR) readings, and miscellaneous environmental variables. Internal sensors 102 and/or external sensors 104 can also include software sensors that can be configured to collect samples of system performance metrics such as system throughput, transaction latencies, queue lengths, load on the central processing unit, load on the memory, load on the cache, I/O traffic, bus saturation metrics, First-In, First-Out (FIFO) overflow statistics, and various other system performance metrics gathered from software. Internal sensors 102 are typically built-in to server 100, while external sensors 104 can be coupled to server 100 when generating an inferential sensing model.

Inferential Sensing Model

Generally, for a system containing N sensors, we can use advanced pattern-recognition techniques to learn the patterns of correlation between the N telemetry signals from the sensors. Then, during operation, we can estimate the value of a given telemetry signal based on the sampled values of the other (N−1) telemetry signals. For example, one technique for using the values of a subset of telemetry signals to estimate the value of given telemetry signals is explained in more detail in U.S. patent application Ser. No. 10/772,111, entitled "Replacing a Signal from a Failed Sensor in a Computer System with an Estimated Signal Derived from Correlations with Other Signals," by inventors Kenny C. Gross, Aleksey M. Urmanov, and Steve S. Lin, filed 3 Feb. 2004 U.S. Pat. No. 7,292,952, which is incorporated by reference herein to describe a technique for estimating the values of telemetry signals.

Embodiments of the present invention use such techniques for estimating the value of telemetry signals to create an inferential sensing model for a system with one or more virtual sensors. This type of inferential sensing model can be generated on a prototype system and then applied in other systems in the following way.

First, we take a prototype of the system into a testing laboratory. Then, in addition to internal sensors that are already built-in to the prototype of the system, we attach one or more high-accuracy external sensors to the prototype of the system. For example, we may attach M external sensors to augment the N internal sensors built-in to the prototype of the system. FIG. 1A shows internal sensors 102 and external sensors 104 in one possible configuration that facilitates generating an inferential sensing model for server 100.

We then generate an inferential sensing model using the (M+N) telemetry signals as inputs, while running dynamic margining experiments on the prototype unit to exercise the measured signals through as much of their full range as possible.

In some embodiments of the present invention, we use a nonlinear, nonparametric regression technique called Logical Combination of Regression Primitives (LCORP) to generate the inferential sensing model. The LCORP technique is described in more detail in U.S. patent application Ser. No. 11/598,608, entitled "Method and Apparatus for Functional Relationship Approximation through Nonparametric Regression," by inventors Kenny C. Gross, Aleksey M. Urmanov, and Anton A. Bougaev, filed 12 Nov. 2006, which is herein incorporated by reference to explain the details of the LCORP technique. Other embodiments of the present invention can use other statistical and/or pattern recognition techniques to generate the inferential sensing model, such as a Multivariate State Estimation Technique (MSET) technique, a neural network technique, or other types of regression.

After we generate the inferential sensing model, we use the inferential sensing model to program or "train" a virtual-sensor-estimating module. We then ship each subsequently manufactured product (chip, component, FRU, etc.) to the field along with a corresponding virtual-sensor-estimating module and a number of internal sensors. During operation, the virtual-sensor-estimating module is used to estimate the values of virtual sensors from values obtained from the internal sensors.

In some embodiments of the present invention, the number of internal sensors included in a shipped product can be less than the number of internal sensors used when generating the inferential sensing model (see FIGS. 1A-1B). In these embodiments, the system estimates values for virtual sensors representing the missing external sensors and values for virtual sensors representing the missing internal sensors.

In some embodiments of the present invention, external sensors are more accurate than internal sensors. In these embodiments, using more accurate external sensors facilitates the generation of a more accurate inferential sensing model. The more accurate inferential sensing model in turn makes it possible to avoid embedding more accurate sensors into server.

Generating an Inferential Sensing Model

Figure 2:
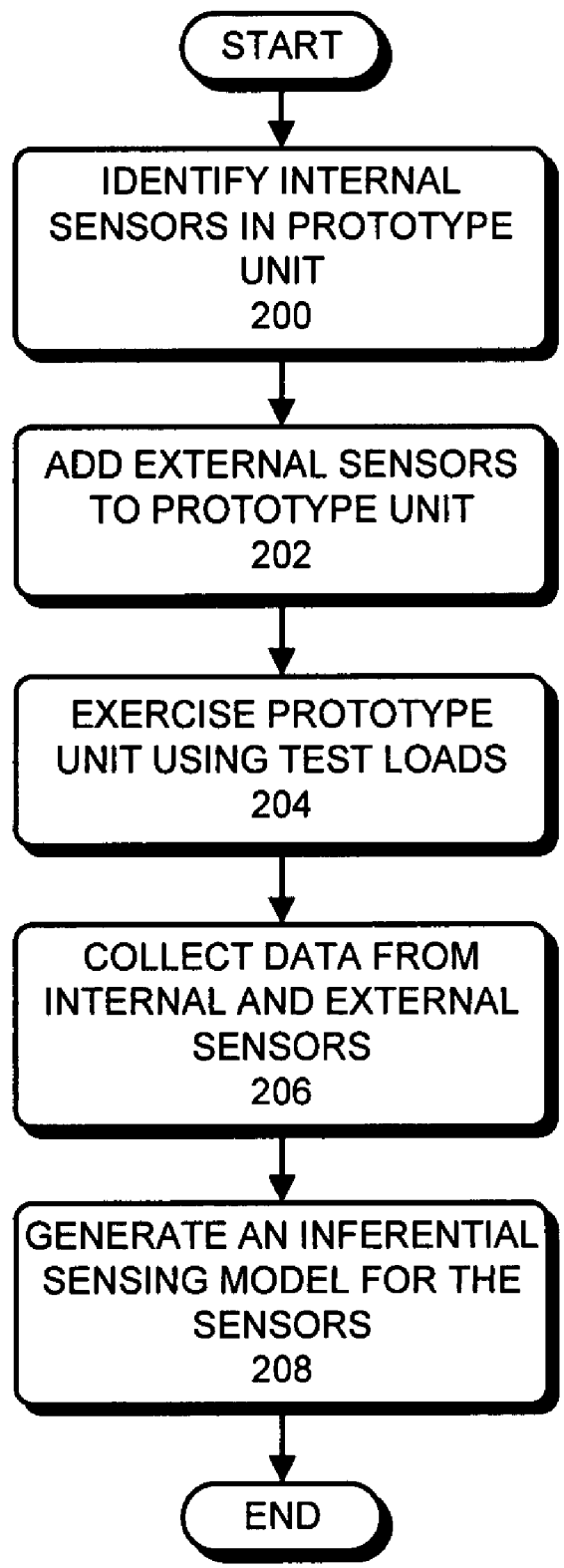
FIG. 2 presents a flowchart illustrating the process of generating an inferential sensing model in accordance with embodiments of the present invention.

FIG. 2 presents a flowchart illustrating the process of generating an inferential sensing model in accordance with embodiments of the present invention. The process starts with the identification of the internal sensors 102 in a prototype unit (step 200). Next, a number of external sensors 104 are added to the prototype unit (step 202).

The prototype unit is then exercised using test loads (step 204) while data is collected from the internal sensors 102 and the external sensors 104 (step 206). These test loads are designed to exercise the system parameters sampled by internal sensors 102 and external sensors 104 through as much of their full range as possible. For example, if the sensors sample temperature, one test load may be designed to cause the prototype unit to reach both extremes of an expected operating temperature scale.

Next, correlations are identified between the values collected by the sensors, and these correlations are used to generate an inferential sensing model for the sensors (step 208).

Using the Inferential Sensing Model

Figure 3:
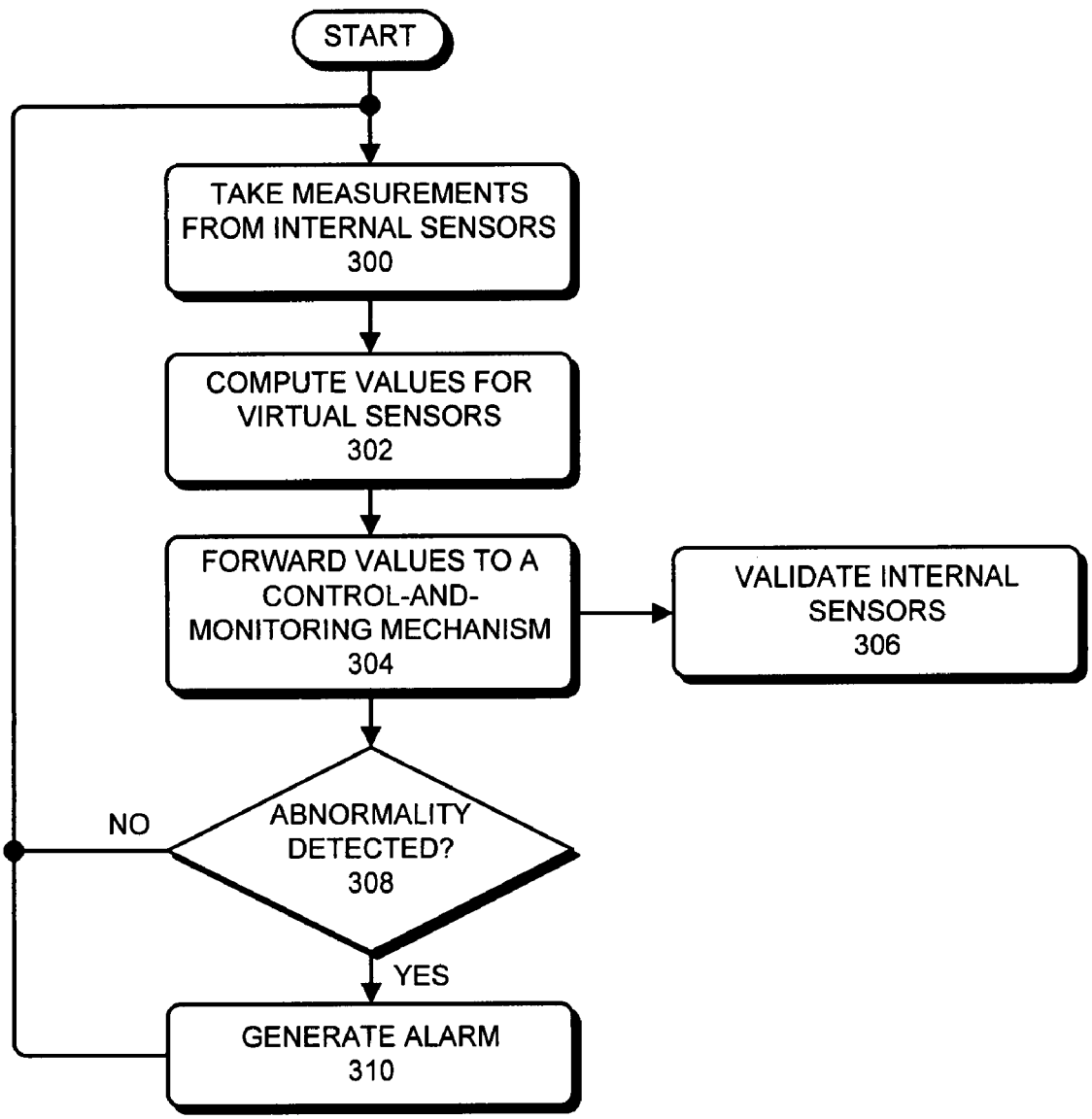
FIG. 3 presents a flowchart illustrating the process of using an inferential sensing model to estimate the value of a virtual sensor in a computer system in accordance with embodiments of the present invention.

FIG. 3 presents a flowchart illustrating the process of using an inferential sensing model to estimate the value of a virtual sensor 106 (see FIG. 1) in a server 100 in accordance with embodiments of the present invention. The process starts when server 100 collects measurements from internal sensors 102 (step 300).

Server 100 then computes values for virtual sensors 106 (step 302). While doing so, server 100 inputs the values collected from internal sensors 102 into the inferential sensing model to determine estimated values for the virtual sensors 106. (Recall that virtual sensors 106 represent the absent external sensors 104 and any removed internal sensors 102.) For example, if a virtual sensor is designated as a temperature sensor, server 100 inputs the temperatures sensed by internal sensors 102 into the inferential sensing model and calculates an estimated value for the temperature for the virtual sensor using the inferential sensing model.

Next, server 100 forwards the computed values to a control-and-monitoring mechanism (step 304). The control-and-monitoring mechanism monitors both the values sampled by internal sensors 102 and the values computed for the virtual sensors 106. The control-and-monitoring mechanism then determines if an abnormality exists in the values (step 308). For example, an abnormality exists if a sampled or computed value indicates a vibration within the server has exceeded a threshold.

If so, the control-and-monitoring mechanism can generate an alarm (step 310). In some embodiments of the present invention, the control-and-monitoring mechanism, (depending on the type of abnormality) can limit the operation of some or all of server 100 in an attempt to prevent the abnormality from worsening.

Although the above-described process relates to virtual sensors 106, the inferential sensing model can also be used to validate internal sensors 102 (step 306). In other words, the system can use the inferential sensing model and the sampled values from the other internal sensors 102 to verify the value indicated by an internal sensor 102. For example, if internal sensor 102 reports a value that exceeds a threshold, before generating an alarm, the control-and-monitoring mechanism can determine if the reported value is close to the value estimated by the inferential sensing model. If not, the internal sensor 102 may be faulty (and may therefore be reporting erroneous values).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining an estimated value for a sensor which has been removed from a system, comprising:
   in a computer system:
      sampling values for performance metrics using external sensors that are coupled to a system and internal sensors that are built into the system, wherein at least one internal sensor is a software sensor;
      generating an inferential sensing model for the system from the sampled values; and
      for one or more external sensors that have been removed from the system:
         sampling values of performance metrics using the internal sensors; and
         generating estimated values for performance metrics for the one or more removed external sensors, by using the sampled values from the internal sensors as inputs to the inferential sensing model.

2. The method of claim 1, wherein when at least one internal sensor is removed from the system and at least one internal sensor remains in the system, the method further comprises:
   during operation, using the inferential sensing model and sampled values of performance metrics from the remaining internal sensors to generate an estimated value for a performance metric for the removed internal sensor.

3. The method of claim 1, wherein during operation, the method further comprises using the inferential sensing model to generate an estimated value for a performance metric for at least one internal sensor from sampled values of performance metrics collected from the remaining internal sensors.

4. The method of claim 1, wherein the method further comprises:
   determining if the sampled values or the estimated values for the performance metrics have exceeded a threshold; and
   if so, generating an alarm.

5. The method of claim 1, wherein sampling the performance metrics involves:
   executing one or more test loads on the system; and
   sampling the performance metrics while the test loads are executing on the system.

6. The method of claim 1, wherein generating an inferential sensing model involves using a Logical Combination of Regression Primitives (LCORP) technique, a Non-Linear Non-Parametric (NLNP) regression technique, or another statistical or regression technique to generate a mathematical model that correlates sampled values of performance metrics.

7. The method of claim 1, wherein sampling values for performance metrics further comprises using sensors that are coupled to a system selected from the group consisting of:
   a chip;
   a component;
   a field-replaceable unit (FRU); and
   a computer system.

8. The method of claim 1, wherein the performance metrics are physical system properties which can include:
   a temperature, a relative humidity, a cumulative or differential vibration, a fan speed, an acoustic signal, a current, a voltage, a time-domain reflectometry (TDR) reading, or other physical properties that indicate a performance of the system.

9. The computer-implemented method of claim 1, wherein the performance metrics are software metrics which can include:
    a system throughput, a transaction latency, a queue length, a load on a central processing unit, a load on a memory, a load on a cache, I/O traffic, a bus saturation metric, First-In, First-Out (FIFO) overflow statistics, or other software metrics that indicate a performance of the system.

10. An apparatus for determining an estimated value for a sensor which has been removed from a system, comprising:
    a sampling mechanism configured to sample values for performance metrics using external sensors that are coupled to a system and internal sensors that are built into the system, wherein at least one internal sensor is a software sensor;
    a generating mechanism configured to generate an inferential sensing model for the system from the sampled values; and
    an estimating mechanism;
    wherein for one or more external sensors that have been removed from the system:
        the sampling mechanism is further configured to sample values of performance metrics using the internal sensors, and
        the estimating mechanism is configured to generate estimated values for performance metrics for the one or more removed external sensors by using the sampled values from the internal sensors as inputs to the inferential sensing model.

11. The apparatus of claim 10, wherein during operation, the sampling mechanism is configured to sample values of performance metrics using the internal sensors and the estimating mechanism is configured to use the inferential sensing model to generate estimated values for performance metrics for a removed internal sensor from the sampled values from a set of internal sensors which does not include the removed internal sensor.

12. The apparatus of claim 10, wherein during operation, the sampling mechanism is configured to sample values of performance metrics using the internal sensors and the estimating mechanism is configured to use the inferential sensing model to generate estimated values for performance metrics for a first internal sensor from the sampled values from a set of internal sensors which does not include the first internal sensor.

13. The apparatus of claim 10, wherein the apparatus further comprises a warning mechanism configured to determine if the sampled values or the estimated values for the performance metrics have exceeded a threshold and, if so, to generate an alarm.

14. The apparatus of claim 10, wherein when sampling the performance metrics, the sampling mechanism is configured to:
    execute one or more test loads on the system; and
    sample the performance metrics while the test loads are executing on the system.

15. The apparatus of claim 10, wherein when generating an inferential sensing model, the generating mechanism is configured to use a Logical Combination of Regression Primitives (LCORP) technique, a Non-Linear Non-Parametric (NLNP) regression technique, or another statistical or regression technique to generate a mathematical model that correlates sampled values of performance metrics.

16. The apparatus of claim 10, wherein the system is:
    a chip;
    a component;
    a field-replaceable unit (FRU); or
    a computer system.

17. The apparatus of claim 10, wherein the performance metrics are physical system properties which can include:
    a relative humidity, a cumulative or differential vibration, a fan speed, an acoustic signal, a current, a voltage, a time-domain reflectometry (TDR) reading, or other physical properties that indicate a performance of the system.

18. The apparatus of claim 10, wherein the performance metrics are software metrics which can include:
    a system throughput, a transaction latency, a queue length, a load on a central processing unit, a load on a memory, a load on a cache, I/O traffic, a bus saturation metric, First-In, First-Out (FIFO) overflow statistics, or other software metrics that indicate a performance of the system.

19. A computer system for determining an estimated value for a sensor which has been removed from a computer system, comprising:
    a processor;
    a memory coupled to the processor, wherein the memory is configured to store data and instructions for the processor;
    a sampling mechanism configured to sample values for performance metrics using external sensors that are coupled to a system and internal sensors that are built into a computer system, wherein at least one internal sensor is a software sensor;
    a generating mechanism configured to generate an inferential sensing model for a computer system from the sampled values; and
    an estimating mechanism;
    wherein for one or more external sensors that have been removed from a computer system:
        the sampling mechanism is further configured to sample values of performance metrics using the internal sensors, and
        the estimating mechanism is configured to generate estimated values for performance metrics for the one or more removed external sensors by using the sampled values from the internal sensors as inputs to the inferential sensing model.

20. The computer system of claim 19, wherein during operation, the sampling mechanism is configured to sample values of performance metrics using the internal sensors and the estimating mechanism is configured to use the inferential sensing model to generate estimated values for performance metrics for a removed internal sensor from the sampled values from a set of internal sensors which does not include the removed internal sensor.

21. The computer system of claim 19, wherein during operation, the sampling mechanism is configured to sample values of performance metrics using the internal sensors and the estimating mechanism is configured to use the inferential sensing model to generate estimated values for performance metrics for a first internal sensor from the sampled values from a set of internal sensors which does not include the first internal sensor.

* * * * *

UNITED STATES PATENT AND TRADEMARK OFFICE
CERTIFICATE OF CORRECTION

PATENT NO.         : 7,751,910 B2                                                                 Page 1 of 1
APPLICATION NO. : 11/787604
DATED              : July 6, 2010
INVENTOR(S)        : Kenny C. Gross et al.

It is certified that error appears in the above-identified patent and that said Letters Patent is hereby corrected as shown below:

In claim 19 (at column 8, line 30), please add the word "computer" so that the line reads: "coupled to a computer system and internal sensors that are built".

Signed and Sealed this

Fourteenth Day of September, 2010

David J. Kappos
*Director of the United States Patent and Trademark Office*